Feb. 16, 1960 R. H. STOW 2,925,174
SOLVENT-RESISTANT PRESSURE-SENSITIVE ADHESIVE TAPE
Filed Nov. 2, 1956
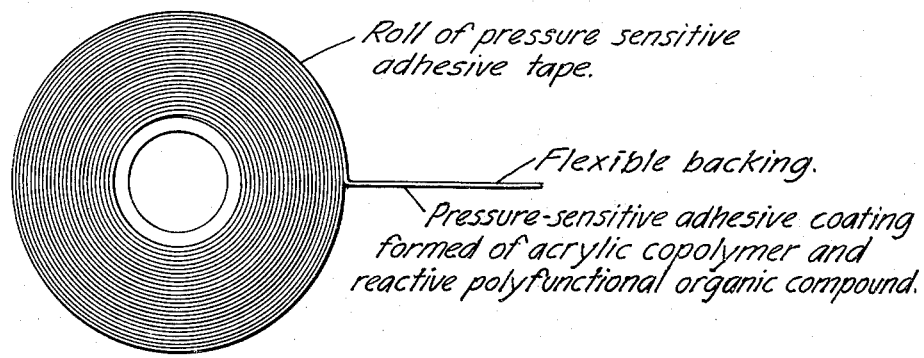
Roll of pressure sensitive adhesive tape.
Flexible backing.
Pressure-sensitive adhesive coating formed of acrylic copolymer and reactive polyfunctional organic compound.
INVENTOR
ROBERT H. STOW

United States Patent Office

2,925,174
Patented Feb. 16, 1960

2,925,174

SOLVENT-RESISTANT PRESSURE-SENSITIVE ADHESIVE TAPE

Robert H. Stow, St. Paul, Minn., assignor to Minnesota Mining and Manufacturing Company, St. Paul, Minn., a corporation of Delaware Application November 2, 1956, Serial No. 620,084

8 Claims. (Cl. 206—59)

This invention relates to solvent-resistant normally tacky and pressure-sensitive adhesives and to sheet material coated therewith. The sheet product in the form of a narrow continuous tape is particularly valuable as an insulating and identifying wrapper for cables, coils, etc., which are subject to contact with transformer oils, aircraft fluids and other common organic solvents.

Normally tacky and pressure-sensitive adhesive tapes are widely used for a variety of sealing, fastening, protecting, marking and masking purposes, but for the most part are highly sensitive to organic fluids and have been little used where they might be exposed to solvent attack. Recently, certain pressure-sensitive adhesive compositions have been developed which exhibit reasonably good resistance to solvent attack, and these have proved to be of considerable commercial value in applications where possible contact with solvents is foreseen. While these solvent-resistant adhesive compositions possess the fourfold balance of adhesion, cohesion, stretchiness and elasticity required of pressure-sensitive adhesives, they normally are entirely lacking in "thumb appeal," a property which previous to their development had come to be an important measure of quality, to experts in the art as well as the casual user. The lack of thumb appeal has been laid to the presence of a thin film of oily material on the surface of the skin, and since the adhesive and oil are incompatible, the oil is not absorbed or dissolved but instead contaminates the surface of the adhesive and renders it non-adherent. If the skin is first thoroughly rinsed with acetone, even these solvent-resistant adhesive tapes adhere easily and firmly to the skin. To insure the firm adherence of this class of pressure-sensitive adhesive tapes to a hard smooth surface, it is common practice to clean the surface thoroughly with solvents.

Certain other pressure-sensitive adhesive compositions are relatively insoluble in common organic solvents and yet retain a substantial degree of thumb appeal. While these can be adhered firmly to surfaces which are slightly greasy or otherwise unclean, they lack cohesion in the presence of solvents and will, for example, string out when contacted by a swab soaked with toluene. A class of pressure-sensitive adhesive compositions of this type which has been used to a considerable extent for solvent-resistant purposes consists of certain copolymers of acrylic acid ester monomer and copolymerizable monomers such as acrylic acid or acrylamide.

It has now been discovered that pressure-sensitive adhesive compositions having while wet with solvent the unique combination of thumb appeal and retention of cohesion, as well as other required properties of pressure-sensitive adhesives, can be formed from pressure-sensitive copolymer of certain non-tertiary alcohol esters of acrylic acid and small proportions of additive copolymerizable monoethylenic monomers containing, bonded to an ethylenic carbon, at least one strongly polar group attached through a carbonyl radical. The novel solvent-resistant pressure-sensitive adhesive compositions are obtained by heating such copolymer with a mutually miscible non-metallic polyfunctional organic compound of primarily carbon-to-carbon skeletal chain, said polyfunctional compound having at least two groups readily reactive to form primary bonds with the strongly polar group of the said copolymerizable monoethylenic monomer, the ratio of said reactive groups in the polyfunctional compound to atoms other than hydrogen in the compound excluding atoms in the reactive groups, extending from about 1:1 to about 1:50.

By "mutually miscible" is meant that the polyfunctional organic compound and the acrylic copolymer are susceptible to mixing with the assistance of gel breakers to form solutions or dispersions which remain free-flowing at ordinary room temperatures for a period of hours. By a group being "readily reactive" with the copolymerizable monoethylenic monomer of the acrylic copolymer is meant that an equivalent weight of the compound formed by this group attached to a primary or secondary alkyl radical of 2 to 8 carbon atoms will react with an equivalent weight of acetic acid, or comparable compound containing the reactive radical of the copolymerizable monoethylenic monomer in place of the carboxyl group, at 25° C. and in the presence of one equivalent or less of water per liter of solution at such a rate that the reaction rate constant $k$ is at least about $1.5 \times 10^{-4}$ or preferably greater than about $1.0 \times 10^{-3}$ where $k$ is defined as $$k = \frac{2.303}{t} \log \frac{c_0}{c_t}$$

where $t$ is the time in hours since the beginning of the reaction, $c_0$ is the initial concentration of the acetic acid or its equivalent, and $c_t$ the concentration at time $t$.

The heating of a mixture of an acrylic copolymer and a polyfunctional organic compound is believed to involve cross-linking of the acrylic copolymer by the polyfunctional compound. The reaction proceeds readily at moderately elevated temperatures and may be effected in a single step, together with evaporation of solvent from the adhesive layer, by merely continuing the heating at the temperature employed for solvent removal. The reaction is accompanied by a substantial reduction in the tackiness of the adhesive layer, and in some cases the adhesive becomes almost non-tacky if the reaction is continued to completion. However, the reaction may normally be virtually stopped merely by cooling to ordinary room temperature, and surprisingly the adhesive composition will remain in a partially reacted, stably tacky state for extended periods. In spite of the adhesive being only partially crosslinked, a distinct improvement in solvent resistance is noted as compared to the non-reacted starting material. Cross-linking may be completed at any time with an accompanying further improvement in solvent resistance by merely reheating the tape for a relatively short period, normally after the tape has been applied to its intended use as by wrapping on electrical wire.

Although cross-linking of the novel pressure-sensitive adhesive compositions entails a corresponding reduction in tackiness, the novel cross-linked adhesives adhere readily to surfaces of glass, metals and the like. The adhesion to the surface is found to increase substantially simply by allowing the tape to remain in contact with the surface for a period of several days at room temperature or by heating a tape for a short period while in contact with the surface.

While the novel adhesives of this invention may swell somewhat on contact with organic solvents, they remain eucohesive, i.e., more cohesive than adhesive, and so can be unwound from roll form, handled with the fingers, and stripped from smooth surfaces while wet with solvent, without off-setting of adhesive. Upon drying, the novel pressure-sensitive adhesives are for the most part equal in quality to adhesives not exposed to solvent, even though held in contact with the solvent for extended periods.

The invention will now be illustrated by the following examples, in which all parts are by weight, without intent to be limited thereto.

EXAMPLE I

A mixture of 163 parts by weight of isooctyl acrylate monomer, 6.8 parts of acrylic acid, 248 parts of ethyl acetate solvent, and 0.62 part of benzoyl peroxide as catalyst was held under a nitrogen atmosphere at 55° C. for six hours with slow stirring to provide a viscous solution. A further 79 parts of ethyl acetate and 0.62 part of benzoyl peroxide was then added, after which the temperature was held at 60° C. for an additional five hours. The solution was thinned with 280 parts of heptane to a coatable viscosity. Analysis revealed the product to be the copolymer of about 96 percent isooctyl acrylate monomer and about 4 percent acrylic acid monomer. The product solution contained about 23.3 percent solids.

The copolymer was coated on tensilized polyethylene terephthalate film, which film had been previously provided with an ultra-thin primer layer applied from a five percent solution in toluol and methyl ethyl ketone of a mixture of one part epoxy resin (Bakelite BR-18774, a product of the Union Carbide and Carbon Corp., which has announced that this resin is now known as ERL-2774), one part of a polyfunctional polymeric amine (Versamid 115), and two parts of nitrile rubber (Chemigum N1NS). The epoxy resin had a melting point of about 10° C. as determined by the Durran's mercury method and an epoxide equivalent weight of about 200 and was believed to be the reaction product of epichlorhydrin and bisphenol. It was stated by the manufacturer, General Mills, Inc., that the polyamine was the addition product of polymerized long chain fatty acids and polyfunctional primary and secondary amines, that the polyamine had a molecular weight of about 1500–2000, and that 244–255 grams thereof would neutralize an equivalent of acid. The polyamine had a Brookfield viscosity of 500–750 poises at 40° C. The nitrile rubber was stated by its manufacturer to be the copolymer of 70 parts butadiene and 30 parts acrylonitrile.

The copolymer coating was dried for five minutes at 140–180° F. followed by an additional ten minutes at about 205° F. to yield a pressure-sensitive adhesive layer having a dry coating weight of about 11.2 grains per 24 square inches.

Otherwise identical tapes were prepared using as the pressure-sensitive adhesive layer similar copolymers of isooctyl acrylate and acrylic acid, one comprising about two percent and the other about six percent acrylic acid monomer. The three adhesive tapes served as controls in the evaluation of the below described tapes.

Into a solution of the copolymer of 96 parts isooctyl acrylate and 4 parts acrylic acid was stirred ten parts (based on 100 parts copolymer) of a polyfunctional polymeric amine (Versamid 100), which polyamine is stated by the manufacturer to be substantially the same as Versamid 115 except in having a molecular weight of about 3000–6000, a ball and ring softening point of 43° C. (ASTM 1240), and in that 603–675 grams thereof neutralize one gram equivalent of acid. Upon mixing, a gel was formed. Denatured ethyl alcohol, which is often effective in breaking gels sometimes formed on mixing of acrylic copolymers and polyfunctional organic compounds in the practice of this invention, was added in an amount equal to solids but did not break the gel. About six parts of acetic acid per 100 parts solids were then mixed in to break the gel and provide a coatable composition which was coated over the primer layer onto tensilized polyethylene terephthalate film as above described to effect upon subjection to the above-described two-step drying cycle a coating weight approximately equal to that of the control tapes. Otherwise identical tapes were prepared in which the copolymer comprised two and six percent acrylic acid monomer, and sets of tapes using the same three copolymers and primed backing film were fabricated to correspond to the set of three control tapes, except that the adhesive composition contained varying proportions of the polyfunctional polymeric amine, i.e., Versamid 100.

Samples of these pressure-sensitive adhesive tapes were tested for resistance to the action of an organic solvent. Strips of tape four inches square were weighed and then individually immersed without agitation in 100 cc. of solvent for 24 hours at room temperature. The squares were then removed and patted to dryness with cheesecloth to remove excess solvent and weighed, after which they were dried at 250° F. for one-half hour and weighed again. The percentage loss in adhesive weight after drying as compared to the initial adhesive weight was taken as the solubility, and the ratio of the weight of the solvent contained in the adhesive layer while wet with solvent to the final dried weight of adhesive is called the swell. Results of immersion for 24 hours in xylol are tabulated in Table A.

Table A

RESISTANCE TO XYLOL

| Percent polyamine | Percent Acrylic Acid Monomer in Copolymer ||||||
|---|---|---|---|---|---|---|
| | 2% || 4% || 6% ||
| | Percent soluble | Percent swell | Percent soluble | Percent swell | Percent soluble | Percent swell |
| 0 | 85 | (*) | 65 | (*) | 62 | (*) |
| 10 | 22 | (*) | 12 | 560 | 11 | 420 |
| 15 | 19 | 840 | 13 | 520 | 10 | 400 |
| 20 | 32 | (*) | 13 | (*) | 11 | 430 |

*Over 1000.

It should be noted that the high degree of insolubility attained with the tapes containing the polyamine as recorded in Table A resulted from heating to an extent comparable to drying cycles normally utilized in the production of pressure-sensitive adhesive tapes.

While cross-linking of the acrylic copolymers with the polyfunctional polymeric amine (Versamid 100) markedly improves the resistance of the pressure-sensitive adhesive composition to organic solvent as demonstrated by the data of Table A, the ability of the adhesive to form strong adherent bonds is not deleteriously affected by the cross-linking as demonstrated by the following test. One-inch wide strips of each tape were rolled into full contact with a polished stainless steel plate, and measurements were taken of the force required to strip each back from the plate at an angle of essentially 180 degrees by moving the plate relative to the free end of the tape at a constant speed of 90 inches per minute. The test was performed for samples of each tape both immediately after application and after heating of the tape in contact with the steel plate to 250° F. for 5 minutes followed by cooling to room temperature. The data, as recorded in Table B, indicates that the adhesives incorporating the polyfunctional polymeric amine exhibit relative poor initial adhesion but that excellent adhesion is attained by mild heating. Experiments have established that the adhesion accomplished by this degree of heating is alternatively realized by allowing the tape to remain in adherent contact with the steel plate at room temperatures for about a week. Thus, the adhesion after heating for 5 minutes at 250° F. may be termed the "dwell" adhesion and is so noted in Table B.

Table B
STRIPBACK ADHESION IN OUNCES/INCH

| Percent poly-amine | Percent Acrylic Acid Monomer in Copolymer | | | | | |
|---|---|---|---|---|---|---|
| | 2% | | 4% | | 6% | |
| | Initial | Dwell | Initial | Dwell | Initial | Dwell |
| 0 | 38 | 57 | 45 | 76 | 47 | 84 |
| 10 | 32 | 89 | 20 | 75 | 12 | 71 |
| 15 | 31 | 84 | 15 | 81 | 8 | 75 |
| 20 | 25 | 92 | 11 | 91 | 6 | 73 |

Each of the pressure-sensitive tapes prepared with the polyfunctional polymeric amine was further tested by wetting the thumb with mineral oil, rubbing this amount of oil over the hands, and then checking the tape for "thumb appeal." Surprisingly in view of their good resistance to solvent attack as evidenced by data recorded in Table B, the tapes each showed good thumb appeal in this test as did each on repeating the test with sundry organic solvents. This test demonstrates that it is unnecessary to clean a smooth surface with solvent before applying thereto the novel pressure-sensitive tapes of this invention, as is normally required with so-called solvent-resistant tapes. Instead, the surface need only be wiped with a dry cloth to remove loose scale or dirt.

EXAMPLE II

A mixture of 104 parts by weight of distilled water, 8 parts of a 28% solution of alkylated aryl polyether sodium sulfonate ("Triton X-200"), 95.5 parts of isooctyl acrylate, 4.5 parts of acrylic acid, and 0.08 part of tertiary dodecyl mercaptan was purged well with nitrogen and brought under a nitrogen atmosphere to 30° C. with agitation. There was then added 0.25 part of potassium persulfate, 0.08 part of sodium bisulfite, and 0.5 part of commercial lauryl sulfate-sodium salt ("Duponol ME"). Polymerization proceeded rapidly with evolution of heat. The copolymer product was recovered from the emulsion, dried and dissolved in a mixture of 80 parts heptane and 20 parts isopropyl alcohol to a coatable viscosity. Analysis showed the copolymer to incorporate about 4 percent acrylic acid monomer.

The copolymer was coated on unprimed one-mil thick (0.001 inch) tensilized polyethylene terephthalate film to provide upon drying five minutes at 125° F., plus 5 minutes at 170° F., plus 10 minutes at 220° F., a coating weight of 10.7 grains per 24 square inches.

A second batch of the copolymer was thoroughly mixed with 15.8 parts (per 100 parts copolymer) of Versamid 100 and coated, after dilution to a suitable viscosity, on an identical unprimed film. The coating weight was 12.7 grains per 24 square inches.

A third batch of the copolymer was mixed with 15 parts (per 100 parts copolymer) of Versamid 100 and coated on the same film, except over an ultra-thin layer of the primer described in Example I, i.e., one part liquid epoxy resin, one part polyfunctional polymeric amine, and two parts nitrile rubber. The dry coating weight was 10.5 grains per 24 square inches.

A one-half inch wide strip of each tape of this example was adhered by its own adhesive to the back uncoated side of an identical strip of the same tape. This pair of strips was spliced to an identical pair of strips by contacting the exposed adhesive faces of each pair, with an end one-half inch of each pair overlapping and with the other ends extending in opposite directions from the spliced area. A rubber roller weighted by one kilogram was then passed three times over the spliced area. The adhesive-to-adhesive splice was tested by hanging the spliced pairs of tapes vertically from the free end of one of the pairs of strips in an oven at 250° F. for 5 minutes, then suspending a one kilogram weight from the free end of the other of the pairs of strips while holding the temperature at 250° F., and noting the time required to break the splice. The test was repeated except that spliced pairs of each tape were held in the oven for two hours at 250° F. before testing the splices. Data obtained is recorded in Table C.

Table C

| Percent Polyamine | Backing primed | Time to Break at 250° F. | |
|---|---|---|---|
| | | After 5 min. | After 2 hours |
| 0 | No | 7 sec | 12 sec. |
| 15.8 | No | 27 sec | 251 sec. |
| 15 | Yes | 42 sec | 991 sec. |

The marked increase in holding time realized with the adhesives containing the polyfunctional polymeric amine, particularly after sufficient heating to effect a substantial degree of cross-linking, is evidence of the excellent cohesion and superior resistance to heat of the novel heat-reacted compositions. The further improvement imparted through the use of a primer layer was particularly evident from a visual examination of the test specimens. The unprimed samples failed between the adhesive and backing in mottled patterns whereas the primed sample showed considerable shear in the adhesive layer.

Since the pressure-sensitive adhesive tapes of this invention are primarily intended for uses in which tape is applied in an overlapping arrangement so that a reasonably strong bond is formed between the adhesive and the back side of the preceding convolution, it is normally preferred that the backing include no backsize coating. Accordingly, an extra-strong bond must normally be afforded between the adhesive and its backing to insure the tape to be unwound from roll form, unless a disposable low-adhesion liner is used. However, the above-described tape prepared with 15.8 parts of Versamid and without a primer was wound into a roll upon itself and stored for more than 19 months at ordinary room temperatures, after which it could be readily unwound without offsetting of adhesive. It was then tested for adhesion to steel by the stripback test described in Example I, yielding a value of 27 ounces per inch of width. The primer layer described in Example I makes more certain the assurance that tapes prepared therewith can be readily unwound without injury. For example, each of the tapes described in Example I and prepared in accordance with this invention were stored in roll form without a liner for a period of months and unwound easily without undergoing offset of adhesive. Each still showed good tackiness.

A number of other primer coatings have also proved to be satisfactory for such purpose. One such consists of a mixture of one part of the liquid epoxy resin BR-18774, one part of Versamid 115, and two parts of the copolymer of 96 parts isooctyl acrylate and 4 parts acrylic acid.

EXAMPLE III

A number of pressure-sensitive tape adhesive compositions employing various polyfunctional organic compounds as cross-linkers were prepared from the copolymer of 96 parts isooctyl acrylate and 4 parts acrylic acid prepared in an emulsion system essentially as described in Example II. Each composition was coated on one-mil tensilized polyethylene terephthalate film, in some cases over the primer layer described in Example I and in some cases without a primer. Strips of each adhesive tape thus produced were tested for solvent resistance and adhesion to steel by the tests described in Example I, first after sufficient heating to drive off the solvent and then after further heating of another strip of the same tape to effect a degree of reaction between the components of the composition.

First, a solution of the copolymer alone was coated on unprimed polyethylene terephthalate film and dried for 10 minutes at 180° F. to a coating weight of 18.1 grains per 24 square inches. This tape showed an adhesion to steel of 60 ounces per inch of width and a solubility in xylol of 99 percent. After further heating at 275° F. for 16 hours of another strip of the tape prior to applying it to the steel plate, its adhesion to steel remained the same, and the solubility dropped to 83 percent. The adhesive was too soluble to allow measurement of the swell value.

A second tape was prepared with unprimed polyethylene terephthalate film from a composition employing 4.9 parts (per 100 parts of the copolymer) of isophthalyl dihydrazide. The adhesive composition was applied to unprimed polyethylene terephthalate film to attain a coating weight of 10.1 grains per 24 square inches after drying for 10 minutes at 150° F. Adhesion to steel was 31 ounces per inch, solubility in xylol was 93 percent, and the swell too large to be meaningful. Another strip subjected to a further 16 hours at 275° F. had an adhesion to steel of 12 ounces per inch, a solubility of 15 percent, and a swell value of 204 percent.

A third tape utilized 4 parts (per 100 parts of copolymer) of 2-ethylhexane diol-1,3. The adhesive composition was applied to an unprimed backing and dried for 30 minutes at 150° F. to yield a coating of 5.5 grains per 24 square inches. The adhesive layer was very tacky and was somewhat lower in cohesive strength than is preferred for pressure-sensitive adhesives. However, after heating for 16 hours at 275° F., the adhesive became satisfactorily firm. Its adhesion to steel was 40 ounces per inch, its solubility in xylol 17 percent, and the swell value was 255 percent.

A fourth tape included 5.2 parts (per 100 parts copolymer) of the liquid epoxy resin described in Example I, i.e., BR-18774. The tensilized polyethylene terephthalate film had been previously provided with a layer of the primer coating described in Example I. The coating weight of the adhesive layer was about 9.5 grains per 24 square inches after drying for 5 minutes at about 125° F. followed by 5 minutes at 175° F. and 10 minutes at 225° F. The adhesive layer was more than 99 percent soluble in xylol. After heating a further two hours at 275° F. to effect a partial cross-linking, the solubility had dropped to 22 percent; and with an additional 38 hours at 275° F. to virtually insure completion of the reaction, its solubility was about 5.5 percent and its swell value only 190 percent. The adhesion to steel of the tape after the initial drying cycle was about 30 ounces per inch; after a further 2 hours at 275° F. prior to application of another strip to the plate, the adhesion was 24 ounces per inch; and after an additional 14 hours at that temperature, a third strip showed 15 ounces per inch. Heating for 5 minutes at 250° F. while in contact with the steel plate increased each of these adhesion values in the order of 50 percent. As was pointed out above, heating of the novel pressure-sensitive tapes of this invention for 5 minutes at 250° F. in contact with a surface gives an excellent indication of the dwell adhesion, that is, the adhesion which would be attained by allowing the tape to remain in contact therewith for at least a week at room temperature.

A fifth tape was prepared with 1.6 parts of ethylene diamine per 100 parts of the isooctyl acrylate/acrylic acid copolymer. The primer layer, coating weight and drying cycle were the same as in the preceding description. The adhesive layer was intially about 98 percent soluble in xylol, but after a further two hours at 275° F., its solubility dropped to 59 percent and attained a value of 21 percent after an additional 14 hours at 275° F. The adhesion to steel of this tape was initially 42 ounces per inch, dropping to 34 ounces after the two hour semi-curing period and to 24 ounces upon presumably becoming fully cured after a total of 16 hours at 275° F. Again, these adhesion-to-steel values each showed about 50 percent increase by virtue of heating for 5 minutes at 250° F. while in contact with the steel plate.

A sixth tape employed an adhesive composition incorporating 1.6 parts of ethanolamine per 100 parts of copolymer. The primed polyethylene terephthalate film, drying cycle and coating weights of the two preceding adhesive tapes were substantially duplicated. As compared to an immediate solubility of this adhesive composition in xylol of about 83 percent, heating for 2 hours at 275° F. brought the solubility percentage to 40 and heating for a further 14 hours reduced it to about 31 percent. Initial adhesion to steel was 45 ounces per inch. After two hours at 275° F., adhesion of the tape measured 37 ounces, but a strip fully cured by heating to 275° F. for 16 hours was essentially non-tacky and would not adhere to the plate even when heated in contact therewith for 5 minutes at 205° F.

A freshly-prepared strip of this sixth tape was wound helically on a glass test tube with each convolution overlapping the previous convolution by one-half the width of the tape. The test tube was then placed in an oven for 40 hours at 275° F. After cooling to room temperature, the tape was found to be strongly adhered to the tube, and efforts at lifting an edge with the fingernail resulted in tearing of the backing. The wrapped tube was then immersed in a mixture of 80 parts of toluol and 20 parts of xylol at room temperature. After a period of 48 hours, the tape showed no tendency to fall off, although it could be peeled away.

EXAMPLE IV

The novel pressure-sensitive adhesive compositions have proved to be useful in the manufacture of stretchable elastic adhesive tapes in conjunction with plasticized vinyl polymer backings. A solution incorporating 15 parts of Versamid 100 and 100 parts of the copolymer of 94 parts of methylisoamyl acrylate monomer and 6 parts of acrylic acid monomer was coated on a film 8–10 mils in thickness of plasticized vinyl polymer (Vinylite VYNW, a copolymer of vinyl chloride and vinyl acetate in a 95:5 ratio) to yield a dry coating weight of about 8 grains per 24 square inches. A strip of this tape was adhered while being elongated 16.7 percent to a glass plate using a rubber roller under full hand pressure. A substantially identical tape save for the omission of the Versamid 100 from the adhesive composition was adhered at the same elongation in the same manner to the glass plate. After one week at room temperature, the tape utilizing the Versamid 100 had recovered only about seven percent, a remarkably low figure, whereas the tape without this polyfunctional polymeric amine had recovered 25 percent of its stretch. In contrast, the best rubber resin adhesives experience a recovery in the order of 40 to 70 percent in this test. The holding ability of the adhesive layer of an elastic stretchable pressure-sensitive tape product is a prime factor in determining the merit of the tape.

Vinyl resin film pressure-sensitive adhesive tapes are often evaluated in part by subjecting a roll of tape to heating, e.g., to 150° F. for one week and observing the effect on the tape and on the roll. After such heating, the tape of this example including the polyfunctional amine showed no indication of deterioration or change and could be unwound as readily as before the test.

EXAMPLE V

A pressure-sensitive adhesive tape was prepared by coating a solution of the copolymer of 96.3 parts of isooctyl acrylate and 3.7 parts of acrylamide on tensilized polyethylene terephthalate film and drying the coating for ten minutes at 150° F. The dry coating weight was 8.5 grains per 24 square inches.

Another pressure-sensitive adhesive tape was prepared from a mixture of 100 parts of this copolymer with 2.9 parts of hexamethylene diamine. After drying for ten minutes at 150° F., the coating weight was 8.9 grains per 24 square inches.

Each adhesive tape was tested for solubility in xylol and in each case at least 95 percent of the adhesive layer dissolved upon 24 hour immersion at room temperature.

Samples of each tape were then heated in an oven for two hours at 275° F. and then tested for solubility in xylol. The adhesive layer containing hexamethylene diamine was now only 2.6 percent soluble in the test whereas that containing no amine was 18.4 percent soluble.

The adhesive layers of each of the tapes after curing for two hours at 275° F. were more harsh or resinous than is desirable for general purpose pressure-sensitive adhesive tapes and so did not exert a steady resistance to stripping at the relatively high rate of stripping employed in the stripback-from steel test described in Example I. For example, the adhesive containing hexamethylene diamine showed a dwell adhesion, on being heated for 5 minutes at 250° F. in adherent contact with the steel plate, of between 24 and 64 ounces per inch while the control tape showed a variation of 0 to 22 ounces. Because of the wide variation, the test does not establish superiority in adhesion of the amine-containing tape. However, since the pressure-sensitive adhesive tapes of this invention are primarily intended for uses in which the tapes will be applied permanently, harshness of the adhesive layer is not a factor of importance. Both tapes have good resistance to removal when wound on a steel bar and heated for a short period.

Improved solvent resistance has also been imparted to pressure-sensitive adhesives based on the copolymer of this example by reaction with liquid epoxy resin, e.g., BR-18774, and with 2-ethylhexane diol-1,3.

Useful pressure-sensitive adhesive tapes may be prepared in accord with this invention using a large number of copolymers of acrylic monomers in addition to the specific copolymers described above. For example, the copolymers may be prepared with acrylic acid ester monomers of varying chain length including methyl, ethyl and propyl acrylates as well as longer chain esters such as tetradecyl acrylates, including both primary and secondary, normal and branched chain alkyl esters. The esters of tertiary alkyl alcohols do not provide the required stickiness and other properties, either in the copolymers obtained therewith or in the novel products of such copolymers and the co-reactive polyfunctional organic compounds, and are excluded. For the same reason, highly branched alkyl chains in which the side chains account for more than about one-half the total number of carbon atoms in the molecule are also excluded. It is also necessary that the acrylic acid ester component contain at least a major proportion of esters having an alkyl chain length of at least four carbon atoms and that the total number of carbon atoms in the average alkyl group be within the range of about 4 to 12 carbon atoms.

A seeming exception to these requirements is the acrylic acid ester of pentanol-3. This secondary alcohol has an alkyl skeletal chain length of only three carbon atoms but provides a polymer, as well as copolymers with small amounts of acrylic acid or the like, which is useful as a normally tacky and pressure-sensitive tape adhesive and can be reacted with polyfunctional organic compounds in the practice of this invention to provide insoluble pressure-sensitive adhesives. While this ester is contemplated as being an equivalent of those above-identified, it is relatively difficult to prepare by direct esterification of the sec-amyl alcohol with acrylic acid and is therefore not presently preferred.

Commerically useful pressure-sensitive adhesive tapes can be obtained in the practice of this invention using copolymers of acrylic acid non-tertiary alkyl ester monomers and additive copolymerizable monoethylenic monomers, which monomers contain, bonded to an ethylenic carbon, at least one strongly polar group attached through a carbonyl radical. The proportion of such additive monoethylenic monomer may comprise about ½ to 12 percent of the weight of the copolymer. The useful range of additive monomer extends to substantially lower proportions than are suitable if the copolymer itself must serve as the pressure-sensitive adhesive in that reaction with polyfunctional organic compounds in the practice of this invention makes the adhesive more firm. Below about ½ percent additive monomer, the reaction product is less resistant to solvents, particularly in its tendency to swell. Above about 12 to 15 percent of additive monomer, the reaction product becomes too firm and hard for best application as a normally tacky pressure-sensitive adhesive. Particularly preferred are tape adhesives produced with about 2 to 6 percent additive monomer, within which range optimum solvent resistance, tackiness and other properties are obtained.

The acrylic acid non-tertiary alkyl ester monomers or mixtures as above identified may be copolymerized with monomers other than those utilized in the examples. Additive monomers which are useful in providing copolymers which may be insolubilized by reaction with the polyfunctional organic compounds include acrylic acid, methacrylic acid, acrylamide, methacrylamide and itaconic acid.

While acrylic acid non-tertiary alkyl ester monomers will normally be copolymerized only with one or more of the additive copolymerizable monomers, small amounts of other monomers may unavoidably be associated with these monomers, or may even be deliberately added, without detracting from the ability of the resulting polymer to provide insoluble pressure-sensitive adhesives upon reaction with the polyfunctional organic compounds. The inclusion of copolymerizable ethylenically unsaturated monomers such as ethyl acrylate, vinyl chloride, various methacrylate esters, butadiene, isoprene, diallyl phthalate, etc., in such limited amounts as do not drastically alter the properties of the non-tertiary alkyl acrylate ester polymer, is therefore to be considered as coming within the scope of the present invention.

Insoluble pressure-sensitive tape adhesives have been prepared in accordance with this invention by using from about 0.4 to about 2.6 equivalents of the co-reactive polyfunctional organic compound per equivalent of acrylic copolymer. As an example, 1.6 parts of ethanolamine employed in Example III per 100 parts of acid-ester copolymer represents a ratio of about 0.94 amine and hydroxyl groups for each carboxyl group. Above an equivalence ratio of about 2.6, the polyfunctional organic compound apparently forms fewer cross-links and more sterile branches and produces less effect on the firmness and consequent resistance to solvents and heat than is desirable. At equivalence ratios of less than about 0.4, the full cross-linking effect is not realized.

A number of polyfunctional organic compounds other than those specified in the above examples have proved to be useful co-reactants with the acrylic copolymers in the production of pressure-sensitive adhesive tapes. Among these are normally solid epoxy resins (e.g., Epon 1001 of the Shell Chemical Corp.), tetraethylene pentamine, and polymeric propylene glycol of 425 average molecular weight. The latter includes about one hydroxyl group for every 14 atoms other than hydrogen, excluding atoms in the hydroxyl groups. At ratios between reactive groups and other non-hydrogen atoms in the polyfunctional organic compound of much more than 1 to 50, the reaction-products with the acrylic copolymers have a tendency toward waxiness and are accordingly less preferred.

In preparing the adhesive tape or coated adhesive sheet materials of this invention, any of the commonly employed flexible backings and a variety of primer coatings, backsizings, and the like may be utilized as will be appreciated by those skilled in the adhesive tape art. Likewise, inert pigments and other modifiers may be added to the adhesive compositions where opacity, color, increased firmness, or other effects are desired. However, where it is intended to use the tape product under conditions of exposure to certain fluids, the backing and primer coating must also be resistant to such fluids. Particularly useful in respect to its resistance to solvents is film prepared from high molecular weight polyester of ethylene glycol and terephthalic acid which is presently available in tensilized film form under the designation "Mylar."

Solvent-resistant pressure-sensitive adhesive tapes have considerable commercial significance, for example, as electrical insulating tapes where contact may be had with transformer oil or the like and for holding, insulating or identifying purposes in automobiles and airplanes, where possible contact with fuel, hydraulic fluid, lubricant, etc., is foreseen.

The need for low adhesion backsizes or low-adhesion liners with the novel pressure-sensitive adhesive tapes to more readily allow the tape to be unwound from roll form depends to a large extent on the specific adhesive formulation, since relatively large percentages of acrylic acid or other additive monomer, e.g., about 6 to 12 percent of total monomer in the polyacrylic material, provide adhesives which tend to become tenaciously bonded to another surface on prolonged contact therewith, while adhesives produced with smaller percentages of additive monomer are more easily removed. By way of example, a coating of a copolymer of 60 parts of octadecyl acrylate and 40 parts of acrylic acid is useful as a low adhesion backsize in conjunction with the novel adhesives and adhesive tapes here described.

The structure of a specific embodiment of the novel pressure-sensitive adhesive tape of this invention is illustrated in the accompanying drawing in which there is shown a roll of pressure-sensitive adhesive tape wound directly upon itself.

The illustrated adhesive tape is provided with a normally tacky and pressure-sensitive adhesive coating prepared in accordance with the principles of this invention and consisting essentially of the product produced by heating together a copolymer of non-tertiary acrylic acid ester and acrylic acid or equivalent additive monomer, as hereinbefore identified, and a mutually miscible polyfunctional organic compound. The tape is wound so that the adhesive coating is on the inside.

I claim:

1. A normally tacky and pressure-sensitive adhesive tape comprising a thin, flexible, moisture- and solvent-resistant backing carrying a surface layer of a pressure-sensitive adhesive composition which reacts upon moderate heating to a solvent-resistant, adherent state, the said composition comprising a mixture of (1) a copolymer of monomers comprising (a) monomeric acrylic acid ester of non-tertiary alkyl alcohol, the molecules of which alkyl alcohol have from 1 to 14 carbon atoms, the average being about 4 to 12 carbon atoms, at least a major proportion of said molecules having a carbon-to-carbon chain of at least four carbon atoms terminating at the hydroxyl oxygen atom, said chain containing at least about one-half the total number of carbon atoms in the molecule, said acrylic acid ester being further characterized as being per se polymerizable to a sticky stretchable and elastic adhesive polymer mass, and (b) at least one copolymerizable monoethylenic monomer containing, bonded to an ethylenic carbon, at least one strongly polar group attached through a carbonyl radical, the total copolymerizable monomer (b) comprising about ½ to 12 percent by weight of the total of said monomers (a) and (b); and (2) a mutually miscible non-metallic polyfunctional organic compound of primarily carbon-to-carbon skeletal chain, said compound having at least two groups readily reactive to form primary bonds with the strongly polar group of said monoethylenic monomer, the ratio of said reactive groups in the polyfunctional compound to atoms other than hydrogen in the compound, excluding atoms in the reactive groups, extending from about 1:1 to about 1:50.

2. A pressure-sensitive adhesive tape or sheet as defined in claim 1 wherein about 0.4 to 2.6 equivalents of the polyfunctional organic compound are present in the adhesive composition per equivalent of the said copolymer.

3. A pressure-sensitive adhesive tape or sheet as defined in claim 1, the backing of which is an oriented polyester film.

4. A pressure-sensitive adhesive tape or sheet as defined in claim 1, wherein the backing member is oriented polyethylene terephthalate film, said tape also having an adhesive primer coating on the inside face of the backing member adapted to increase the anchorage of the adhesive coating.

5. A convolutely wound roll of the normally tacky and pressure-sensitive adhesive coated sheet or tape of claim 1 in narrow continuous tape form and capable of being unwound from said roll without splitting and offsetting of the adhesive surface layer.

6. A stably tacky and pressure-sensitive adhesive tape comprising a thin, flexible, moisture- and solvent-resistant backing carrying a surface layer of a solvent-resistant, pressure-sensitive adhesive composition, comprising partially interreacted materials consisting of (1) a copolymer of monomers comprising (a) monomeric acrylic acid ester of non-tertiary alkyl alcohol, the molecules of which alkyl alcohol have from 1 to 14 carbon atoms, the average being about 4 to 12 carbon atoms, at least a major proportion of said molecules having a carbon-to-carbon chain of at least four carbon atoms terminating at the hydroxyl oxygen atom, said chain containing at least about one-half the total number of carbon atoms in the molecule, said acrylic acid ester being further characterized as being per se polymerizable to a sticky stretchable and elastic adhesive polymer mass, and (b) at least one copolymerizable monoethylenic monomer containing, bonded to an ethylenic carbon, at least one strongly polar group attached through a carbonyl radical, the total copolymerizable monomer (b) comprising about ½ to 12 percent by weight of the total of said monomers (a) and (b); and (2) a mutually miscible non-metallic polyfunctional organic compound of primarily carbon-to-carbon skeletal chain, said compound having at least two groups readily reactive to form primary bonds with the strongly polar group of said monoethylenic monomer and having a ratio of one of said reactive groups to about 1–10 atoms other than hydrogen in said compound, excluding atoms in the reactive groups, which pressure-sensitive adhesive layer when heated further reacts to an even more solvent-resistant state and, if heated in adherent contact with a solid object, remains firmly adherently bonded thereto.

7. As a new product of manufacture, an electrical component having as electrical insulation the adhesive tape of claim 1 adherently bonded thereto in an overlapping arrangement, the said adhesive tape being free from backsize coating whereby a strong bond is formed between overlapping layers of the tape.

8. The method of making a solvent-resistant, normally tacky and pressure-sensitive adhesive tape consisting essentially of the steps (1) of blending together in a volatile liquid vehicle mutually miscible components consisting essentially of the copolymer and non-metallic polyfunctional organic compound of the surface layer of the adhesive tape defined in claim 1, (2) coating a thin layer of the blend on flexible, solvent- and moisture-resistant sheet material, (3) heating the sheet at a temperature and for a time sufficient to drive off the volatile vehicle, and (4) continuing the heating at a temperature and for a time sufficient to react the components of said blend to a solvent-resistant, stably tacky state.

References Cited in the file of this patent

UNITED STATES PATENTS

| | | | |
|---|---|---|---|
| 2,110,975 | Henderson | Mar. 9, | 1938 |
| 2,328,057 | Coulter | Aug. 31, | 1943 |
| 2,464,826 | Neher et al. | Mar. 22, | 1949 |
| 2,681,327 | Brown | June 15, | 1954 |
| 2,689,858 | Boyd | Sept. 21, | 1954 |
| 2,753,284 | Pahl et al. | July 3, | 1956 |
| 2,754,280 | Brown | July 10, | 1956 |
| 2,757,106 | Brown | July 31, | 1956 |
| 2,772,166 | Fowler | Nov. 27, | 1956 |
| 2,772,251 | Hansen et al. | Nov. 27, | 1956 |

UNITED STATES PATENT OFFICE
CERTIFICATE OF CORRECTION

Patent No. 2,925,174                          February 16, 1960

Robert H. Stow

It is hereby certified that error appears in the printed specification of the above numbered patent requiring correction and that the said Letters Patent should read as corrected below.

Column 1, line 67, for "copolymer" read -- copolymers --; column 4, line 67, for "relative" read -- relatively --; column 12, line 52, for "1-10" read -- 1-50 --; line 67, for "steps (1) of" read -- steps of (1) --.

Signed and sealed this 30th day of August 1960.

(SEAL)
Attest:

ERNEST W. SWIDER
Attesting Officer

ROBERT C. WATSON
                                               Commissioner of Patents